US006629063B2

(12) United States Patent
Wagstaff et al.

(10) Patent No.: US 6,629,063 B2
(45) Date of Patent: Sep. 30, 2003

(54) AMPLITUDE TEMPORAL ORDER DEPENDENT ADAPTIVE PROCESSOR

(75) Inventors: Ronald A. Wagstaff, Slidell, LA (US); Jackson A. Mobbs, Cabot, AR (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 09/916,594

(22) Filed: Jul. 30, 2001

(65) Prior Publication Data

US 2003/0021187 A1 Jan. 30, 2003

(51) Int. Cl.[7] .............................. G01S 3/80; H04B 1/06

(52) U.S. Cl. ....................... 702/189; 702/190; 367/135; 367/124

(58) Field of Search ................................ 702/189, 190, 702/193, 194, 197, 57, 66, 75, 76, 77; 367/135, 137, 138, 118, 119, 124, 125; 708/403, 404

(56) References Cited

U.S. PATENT DOCUMENTS

| | | | | | |
|---|---|---|---|---|---|
| 5,249,205 | A | * | 9/1993 | Chennakeshu et al. | 375/348 |
| 5,732,045 | A | * | 3/1998 | Wagstaff et al. | 367/135 |
| 5,886,951 | A | * | 3/1999 | Wagstaff et al. | 367/135 |
| 6,036,351 | A | * | 3/2000 | Wagstaff | 708/321 |

OTHER PUBLICATIONS

Wan et al., "Optimal Tonal Detectors Based on the Power Spectrum". IEEE Journal of Oceanic Engineering, vol. 25, No. 4. Oct. 2000.*

Gardner et al., "DIET AWSUM: A Fluctuation–Based Deconvolution Technique for Enhancing Signal–to–Noise Ratio and Resolution". IEEE Journal of Oceanic Engineering, vol. 22, No. 1, Jan. 1997.*

Wagstaff, "The AWSUM Filter: A 20–dB Gain Fluctuation–Based Processor". IEEE Journal of Oceanic Engineering, vol. 22, No. 1, Jan. 1997.*

Battaglia, "Mean Square Error". AMP Journal of Technology, vol. 5. Jun. 1996.*

Wagstaff et al., "von WISPR Family Processors: vol. 1" Publication, Naval Research Laboratory, Stennis Space Center, MS, NRL/FR/7176–96–9650, Jul. 7, 1997. vol. 1, pp. 1–143.*

Ronald A. Wagstaff, Allen E. Leybourne and Jacob George, von WISPR Family Processors: vol. 1, Publication, Naval Research Laboratory, Stennis Space Center, MS, NRL/FR/7176–96–9650, Jul. 7, 1997, vol. 1, pp. 1–143.

* cited by examiner

*Primary Examiner*—Marc S. Hoff
*Assistant Examiner*—Jeffrey R West
(74) *Attorney, Agent, or Firm*—Chester L. Jordan; John J. Karasek

(57) ABSTRACT

An acoustic signal processor that samples acoustic data, performs a spectrum analysis of the sampled acoustic data, stores the acoustic data in corresponding frequency bins, and then filters acoustic data stored in a frequency bin by applying a power-law arithmetic operation to the frequency bin acoustic data, such that the power-law arithmetic operation is adaptively changed based on an order dependent determination of whether the frequency bin acoustic data is representative of noise or clutter, or whether it is representative of a signal of an object.

19 Claims, 5 Drawing Sheets

AMPLITUDE TEMPORAL ORDER DEPENDENT ADAPTIVE PROCESSOR

BACKGROUND OF THE INVENTION

1. Field of the Invention

The present invention relates to a signal processor having an improved signal to noise ratio. More specifically, the present invention relates to a signal processor which uses amplitude temporal fluctuations of a received signal to apply a power-law operation, whereby the power-law operation changes based upon whether the amplitude temporal fluctuations indicate that sampled data of the received signal relate to noise or clutter, or whether the sampled data relates to a signal representative of an object.

2. Description of the Related Art

For signals traveling through a propagation pathway, inherently, the surrounding environment causes amplitude temporal fluctuations to be generated in the signals. There is no way to avoid such amplitude temporal fluctuations. In many cases, these fluctuations may cause degraded performance in signal processors attempting to receive or interpret such signals.

To minimize such fluctuations, several methods have been applied, such as power averaging of the received signal for a time duration much longer than the fluctuation periods and carefully designing signal measurements to reduce the effects of the mechanisms that generated the fluctuations. For example, in an underwater acoustic wave environment, a particular acoustic propagation condition (e.g., propagation path, frequency, source and receiver depths, and acoustic environment) and fluctuation generation mechanisms encountered during propagation (e.g., internal waves and reflection from the moving sea surface) effectively "encode" both the acoustic signal and noise with a unique fluctuation character. The net effect of this fluctuation character, for underwater acoustic signal processors (e.g., sonar), is to induce temporal variations, or fluctuations, in the phases and amplitudes of the acoustic signals and noise. The induced fluctuations individualize the various acoustic signals and noise. For example, acoustic signals from a submerged acoustic source in the ocean will have smaller fluctuations than ambient noise and signals from acoustic sources near the sea surface. This individuality can be identified by a fluctuation sensitive acoustic signal processor and used to enhance aspects of its performance, such as improving the detectability of the signal by reducing the noise and clutter, thereby increasing the signal-to-noise ratio (SNR).

It has long been recognized that fluctuations in the amplitudes of received signals and noise can have an important influence on the performance of an acoustic signal receiver. Research has shown that the presence of fluctuations actually can extend the acoustic detection range of an underwater acoustic signal receiver, e.g., sonar receiver on a submarine. Previously, it has been suggested that the amplitude distribution of the acoustic signal from a submerged source can provide a clue to determining the propagation paths between the submerged source and acoustic signal receiver and hence, the depth of the submerged source. For example, in a submarine environment it may be beneficial to actually utilize the fluctuations to increase the range for detecting objects, both submerged and on the water surface. However, outside of these two noteworthy exceptions, the general rule has been that fluctuations are considered to be a nuisance that degrade an acoustic signal processor's performance, as well as signal processors designed for alternative signal types, and should be ignored, reduced, or avoided whenever possible.

Extensive theoretical and empirical studies have been conducted into the mechanisms that cause or generate amplitude fluctuations in the underwater acoustic environment. Some of the causes that are considered to be the most important, for periods of a few minutes or less, include the following: thermal and salinity finestructure; internal waves; turbulent particle velocities; ray-path or wave-front reflection from the moving irregular sea surface; source-receiver range separation changing; source and/or receiver vertical motion causing temporal changes in modes or ray-paths; source radiation amplitude instability; and influence of multi-path arrivals.

The causes of amplitude fluctuations mentioned above are not comprehensive of all causes that are known, nor do all apply to every type of propagation media, such as for optical signal propagation, electrical signal propagation, magnetic signal propagation, or even for electromagnetic signal propagation. The present invention is broadly applicable to all of the aforementioned environments, but herein we will only discuss it's applicability to underwater acoustic propagation. The above fluctuations generating mechanisms listed above are simply those that are believed to be the most important in underwater acoustic propagation, for the time scales of a few minutes or less for the fluctuation-based acoustic signal processors considered herein. Nevertheless, the present invention applies to those other propagation environments with their corresponding fluctuation generation mechanisms and fluctuation time scales.

The present invention, including a corresponding acoustic signal processor, is set forth herein using underwater acoustic data. And as noted above, similar principles, applications, and results would be expected for its use in other propagation media.

Typically, a source may emit a known acoustic signal into an underwater environment, and thereafter receive the reflection of that acoustic signal as the acoustic signal returns to the source. The returning signal will typically indicate the presence of an object based upon the amount of time the acoustic signal was in transit and the direction from which the acoustic signal returned to the source. Usually, a submerged source, as well as surface ships, utilize a group of hydrophones that can be dragged behind the submerged source. With the distance between hydrophones being known and the signal strengths of each returning acoustic signal detected by the individual hydrophones being known, a 3-dimensional direction of the return path of the returning acoustic signal can be calculated. Based on the calculated return path and known time lapse, an actual positioning of an object can be determined. If the actual position of the object is known, then a comparison between the detected position and the known position can show these aforementioned temporal fluctuations, where the fluctuation mechanisms "encode" the returning acoustic signal with a fluctuation character. Here, where the source knows what acoustic signal was sent out, e.g. a ramp, knows what acoustic signal to expect in return, i.e., the ramp, and knows the positioning of the detected object, then these fluctuations can be detected. Within the detected fluctuations there will be low fluctuation amplitude (LOFA) signals and high fluctuation amplitude (HIFA) clutter signals, where the HIFA signals are usually of most concern, as their high amplitude overpowers the acoustic signal. Typically, though the source may be passively "listening" and would not know the character, e.g., the ramp, of the acoustic signal that it is receiving nor the positioning of objects in the underwater environment. With this dilemma in mind, the present invention overcomes these difficulties by using an acoustic signal processor to detect and utilize the differences between these LOFA and HIFA signals for increased signal to noise performance.

In order to design an acoustic signal processor that will detect LOFA signals against a competing background of ambient noise and HIFA clutter signals from surface objects, such as ships, some feature, characteristic, or property of the acoustic signal must be identified, which is different for the LOFA signals than it is for the noise and other HIFA signals that are not of interest. An example of a characteristic that has been focused on by a very common signal processor AVGPR (average power or power-law processor) is the acoustic signal amplitude at a given frequency. As noted above, it is a practice in determining the characteristic of an acoustic propagation path to project a high amplitude acoustic signal at a known frequency or frequency range, such as the ramp, and then to identify the returning acoustic signal in the acoustic signal processor's output by its large output signal to noise ratio. Unfortunately, LOFA signals at unknown frequencies can not be distinguished from HIFA signals by amplitude, as high or low amplitudes for LOFA and HIFA signals are not unique to one or the other.

The present invention solves these aforementioned problems by distinguishing LOFA signals from HIFA signals and noise, based on amplitude fluctuations in the received signal to provide a preferential gain for the LOFA signals.

SUMMARY OF THE INVENTION

An object of the present invention is to distinguish between LOFA signals and HIFA signals and noise using an acoustic signal processor, with the acoustic signal processor being sensitive to amplitude fluctuations.

A further object of the present invention is to use the squares of successive differences in temporary successive log amplitudes to accomplish a preferential signal to noise ratio increase.

Another object of the present invention is to implement a signal processing method, including receiving a plurality of data samples, and filtering a first group of the plurality of received data samples for a first signal by applying a power-law arithmetic operation to the first group of data samples, such that the power-law arithmetic operation is adaptively changed based on an order dependent determination of whether the first group of the data samples is representative of noise or clutter.

Another object of the present invention is to implement an apparatus for filtering noise from a received signal to improve the signal to noise ratio of the received signal, including a processor programmed to filter data samples of the received signal by applying a power-law arithmetic operation to the data samples, such that the power-law arithmetic operation is adaptively changed based on an order dependent determination of whether the data samples are representative of noise or clutter.

A further object of the present invention is to implement an acoustic measuring method, including sampling acoustic data, spectrum analyzing the sampled acoustic data, storing the analyzed acoustic data in corresponding frequency bins, and filtering acoustic data stored in a first frequency bin by applying a power-law arithmetic operation to the first frequency bin acoustic data, such that the power-law arithmetic operation is adaptively changed based on an order dependent determination of whether the first frequency bin acoustic data is representative of noise or clutter.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENTS

Figure 1:
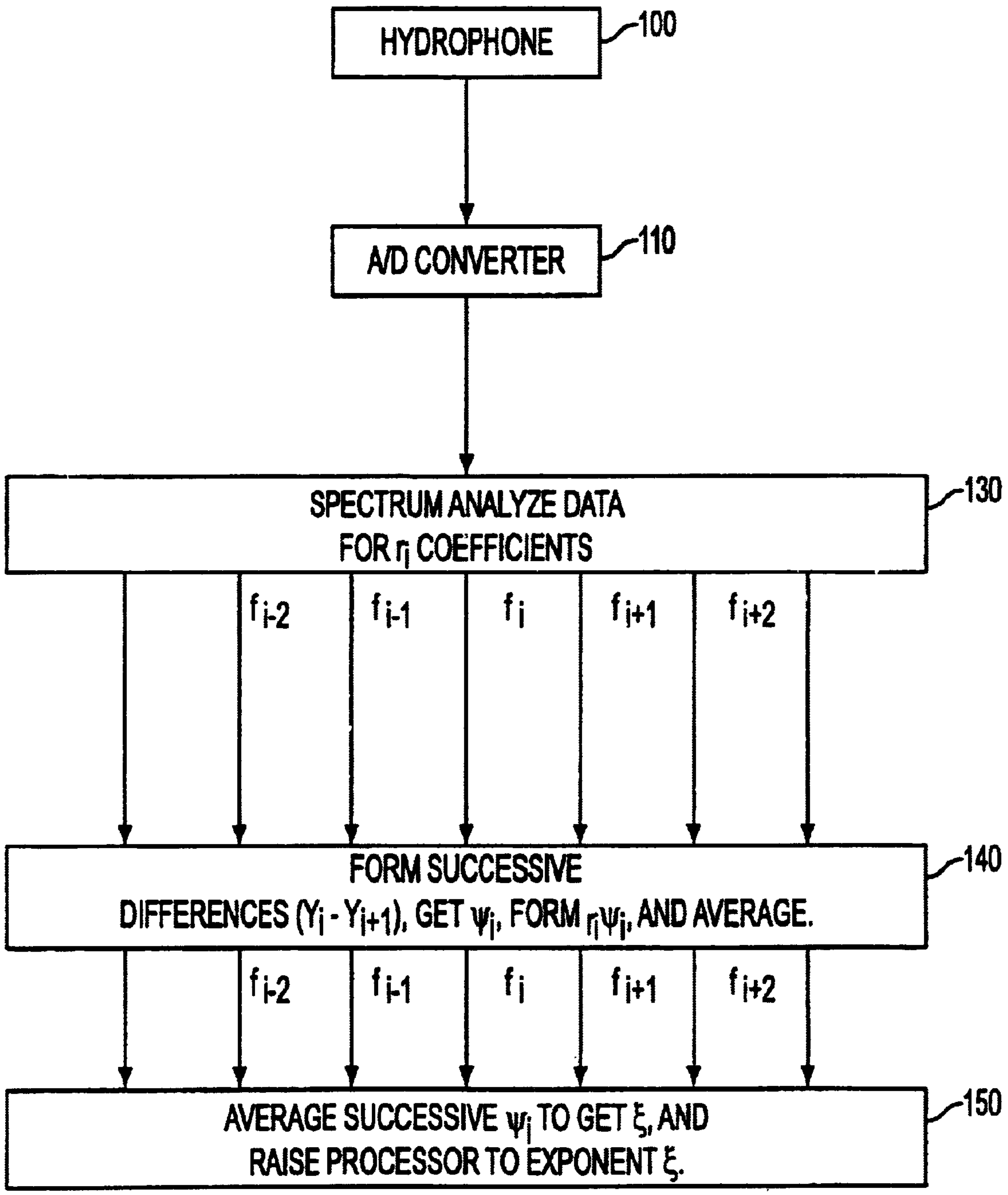
FIG. 1 is a flow chart of an embodiment of the present invention showing the operation process of an acoustic signal processor.

Reference will now be made in detail to the preferred embodiments of the present invention, examples of which are illustrated in the accompanying drawings, wherein like reference numerals refer to like elements throughout. In accordance with the preferred embodiments, there is provided a method and apparatus for increasing the signal to noise ratio of a received signal through an amplitude temporal order dependent adaptive process.

As noted above, typical methods for sifting through received acoustic signals and suppressing the potential noise and H IFA signals was to apply a AVGPR arithmetic operation to a received acoustic signal to produce a signal amplitude at a given frequency. The AVGPR arithmetic operation can be defined by the following equation:

$$AVGPR = \frac{1}{N}\sum_{i=1}^{N} r_i^2$$

where N=the total number of data samples and r=ith sample of a measured quantity such as voltage amplitude or acoustic pressure amplitude ($r_i^2$ being the power magnitude).

AVGPR is a power-law arithmetic operation, with the term "power-law" referring to the exponent of the $r_i$ term. Typically, a processor will perform this operation using the received acoustic signal such that for every frequency range, an N number of data samples in that frequency are squared and thereafter the squared samples are averaged, thus performing the above AVGPR arithmetic operation. In an acoustic signal processor the received acoustic signal is usually received for a multiple number of frequencies all at the same moment, with data samples of the received signal typically being stored in memory bins, such that each frequency may have a memory bin with a multiple number of corresponding data samples stored therein.

For each frequency a more general form of AVGPR power-law arithmetic operation, regarding the exponent for the term $r_i$, may have any arbitrary real exponent in place of the integer 2. There have been studies that have determined the optimum value for such a real exponent should be 2.4, which is considered to be the optimum value for a sinusoidal signal with Gaussian white noise. However, where LOFA and HIFA signals, as well as noise, are present, the above optimum value would not be appropriate, or rather would not properly increase the signal to noise ratio of a received acoustic signal. Hence, other arithmetic operations will now be discussed herein for conditions when the power-law processor is not optimum, i.e. where LOFA and HIFA signals are present, as well as when the noise does not approximate Gaussian white noise.

As discussed herein, fluctuation based processing can be defined by adapting the AVGPR arithmetic operation, or other similar power-law equations, to adapt to fluctuations of the received acoustic signal. Since the aforementioned fluctuation character of the received acoustic signal changes based on the nature of the environment, the presently disclosed adaptive arithmetic operation is thus "environmentally adaptive."

Using the above AVGPR equation as an example, the optimum exponent value had been set to 2.4, or in the standard AVGPR equation, 2. However, the exponent value is not restricted thereto. When the exponent value is 2.4 there is a small gain in signal to noise ratio, though this gain is not much greater than that of when the exponent is only 2. The applicants have discovered that it would be beneficial to change this exponent value based on whether the received acoustic signal is representative of noise, e.g., using a small exponent value such as −1 to 1, and change the exponent value to a large value, such as 10, when the received acoustic signal appears to be representative of an object, i.e., when the received acoustic signal is more likely representative of the detected object rather than merely noise. Thus, by having a low exponent value for noise, and a large exponent value for an acoustic signal of an object, data samples, of the acoustic signal, that appear representative of an object are given greater weight, such that when the aforementioned AVGPR averaging is performed the signal to noise ratio of the received signal is increased because the noise has been suppressed and the acoustic signal of the object signal has been amplified.

By way of example, one way of adapting the AVGPR arithmetic operation, or any power law equation, is through the use of a WISPR IVn (Wagstaff's Integration Silencing Processor) processor, which utilizes the temporal order dependence of the acoustic powers (proportional to $r_i^2$) or pressure amplitudes (proportional to $r_i$) to an appropriate exponent. The WISPR IVn processor can detect the difference between data samples representative of noise in a received acoustic signal and data samples representative of a probable object, using a temporal difference in the values of received data samples. The WISPR IVn processor operation is defined in terms of acoustic power as:

$$WISPR\ IV_n = \frac{1}{N-n+1}\sum_{m=1}^{N-n+1}\left\{\frac{2}{n(n-1)}\left[\sum_{i=m+1}^{m+n-1}\sum_{j=m}^{i-1}(Y_i - Y_j)^2\right]\right\}$$

-continued where $$Y_i = 20\log r_i = 10\log r_i^2$$

and $(Y_m - Y_i)$ = the successive log differences in the above 10 log power (20 log $(r_m/r_i)$);

$n$ = group size, i.e., the number of data samples that are used to form the differences;

$N$ = the total number of data samples in a corresponding frequency bin; and $r_i$ = the ith pressure amplitude, as similarly used in *AVGPR*.

The $Y_i$ values are taken two at a time to form the difference terms in the above WISPR IVn equation. The double summation corresponds to the n(n−1)/2 possible differences in available data samples, without repeating the same i-j pair. In addition, it is noted that although the data samples must be successive, they do not have to be directly adjacent. All that is needed is that there is an order dependence to the successiveness of the data samples.

Briefly, the above WISPR IVn equation sets forth an arithmetic operation to selectively indicate whether a group of sampled points is representative of noise or representative of an acoustic signal received from an object. As noted above, the previous methods applied the AVGPR arithmetic operation to sampled data in a frequency bin. The WISPR IVn operation, rather than averaging a series of squared samples, averages a series of squared differences between data samples. Typically, a probable acoustic signal received from an object will not have large fluctuations from adjacent, or nearly adjacent, data samples, while noise and HIFA signals will have great fluctuations between data samples. Thus, a WISPR IVn processor exaggerates the output such that noise and HIFA signals, of the received signal, are greatly amplified, while nearly zeroing out the output when the samples are representative of an object. Thus, when the output of the WISPR IVn processor is inverted and reapplied to the received acoustic signal, the noise and HIFA signals can be greatly suppressed while amplifying the acoustic signal that appears to be representative of an object. Similarly, the WISPR IVn processor operation may be utilized to control the aforementioned exponent values of the AVGPR operation, such that the exponent value is large for acoustic signals that appear to be representative of an object and small for noise and HIFA signals. It should be noted that the use of the WISPR IVn processor, to control the exponent value determination, is only being utilized as an example. Any arithmetic operation which can distinguish between noise, HIFA signals and acoustic signals that appear to be representative of an object, could similarly be used to control the value of the exponent value of any power-law arithmetic operation, to increase the signal to noise ratio of an acoustic signal representative of an object.

WISPR IVn has been set forth as an order dependent operation, because typically adjacent samples are utilized to derive the difference being squared and averaged. It is not necessary for the data samples to be directly adjacent, only that there is some order dependence in the difference calculations. Taking a difference of random data samples would not produce the proper result, as the WISPR IVn operation is dependent on the premise that amplitudes of nearly adjacent data samples, of an acoustic signal representative of an object, do not change much, while the amplitude of adjacent data samples of noise and HIFA signals do typically change drastically between data samples.

Thus, the WISPR IVn processor operation is order dependent, and as embodiments of the present invention may be based thereon, they too may be order dependent. However, as there may be alternative methods to determine the difference between noise and HIFA signals and acoustic signals that appear to be representative of an object, which may not be order dependent, such embodiments of the present invention may not be order dependent.

Thus, to further with the WISPR IVn operation example, the following is a fluctuation-based arithmetic operation, which uses the order dependence of the WISPR IVn operation to adaptively change a power-law equation, and will be designated herein as an AWSUM Environmentally Sensitive Adaptation (AWSUM ESA) processor, and may be defined as follows:

$$AWSUM\ ESA = \left[\frac{1}{N-n+1}\sum_{i=1}^{N-n=1} r_{i+n-1}\Psi i+n-1\right]^{\xi}$$

where $$\Psi_{i+n-1}=F(WISPR\ IV_n)$$

and

F(WISPR IVn)=a general function of WISPR IVn.

F(WISPR IVn)=A+B[WISPR IVn]=an equation useful in underwater acoustics, where A and B are constants that depend on processing parameters (e.g., frequency resolution, overlap of the successive fast Fourier transforms (FFT), group size(n)) and the type of data (e.g., acoustic, electromagnetic, or optical, for example). For underwater acoustic data samples with a group size n=3 and 75% overlap, A could be 4.8 and B could be −0.25.

The exponent term ξ in the above AWSUM ESA may be defined as follows:

$$\xi = \frac{1}{2(N-n+1)}\sum_{i=1}^{N-n+1}\Psi_{i+n-1}$$

As noted above, for an acoustic signal with small successive differences between data samples, the WISPR IVn operation will approximate a zero value. Thus, by applying the above A and B constants the following becomes true:

$$r_{i+n-1}^{\Psi i+n-1} \cong r_{i+n-1}^{2.4}$$

which corresponds to the optimum power law arithmetic operation for Gaussian white noise and a sinusoid signal, as previously set forth in the background.

Thus, the above AWSUM ESA arithmetic operation sets forth an embodiment of the present invention utilizing the WISPR IVn operation, whereby a power-law operation is adaptively controlled to suppress noise and HIFA signals, while amplifying signals that appear to be representative of an object.

In addition, an un-alerted automatic ESA detector of acoustic signals that have small enough fluctuation amplitudes to be characteristic of amplitude stable signals and representative of an object, such as a submerged underwater sound projector for example, can be defined as:

$$ESA=AVGPR/AWSUM\ ESA$$

The ESA automatic detector can be used to alert users, of the acoustic signal processor, of an object detection. A data dependent (i.e., environmentally dependent) threshold can be determined for which an ESA value that is less than the threshold indicates, with a high degree of confidence, that a certain received acoustic signal is representative of an object, e.g., from a submerged projector. A typical threshold for underwater acoustic signals is ESA<1.4, for example. Though, different thresholds could be used based upon the desired sensitivity of the automatic detection.

Hence, an ESA value less than 1.4 (1.5 dB), for example, would indicate that an automatic ESA detection has occurred for a received acoustic signal that has fluctuation amplitudes less than the threshold. For example, the interpretation for underwater sample data of a received acoustic signal may be that the ESA processor has detected an acoustic signal from a submerged projector.

For a further understanding of the operation of the present invention, FIG. 1 illustrates a flow chart of an embodiment of the present invention showing the operation process of an acoustic signal processor. Specifically, FIG. 1 is a flow chart illustrating acoustic pressure measuring by a hydrophone in an underwater environment, for an embodiment of the present invention, including sampling of the time domain data received by a hydrophone in operation 100. In operation 110, analog signals from the hydrophone are converted by an analog-to-digital (A/D) conversion unit, thus producing digital samples of the received signal. Spectrum analyzing of the digital samples is thereafter performed to obtain pressure amplitudes, as illustrated in operation 130. The pressure amplitudes are then modified in operation 140 to generate the differences ($Y_i$—$Y_{i+1}$), when data samples are adjacent, generate Ψ, and perform an averaging operation. In operation 150, the sequential products are summed and modification of the AWSUM ESA exponent with the average ξ is performed. As illustrated in FIG. 1, there are typically a multiple number of frequency bins, $f_{l-2}$ to $f_{l+2}$. These operations may be implemented by one processor, one processor in each frequency bin, or with the present adaptive arithmetic operation being implemented by a processor separate from a power-law processor, noting that the adaptive operation could be implemented via fully hard wiring, partially through processor operations, or fully through a software implementation in a computer processor.

Figure 2A:
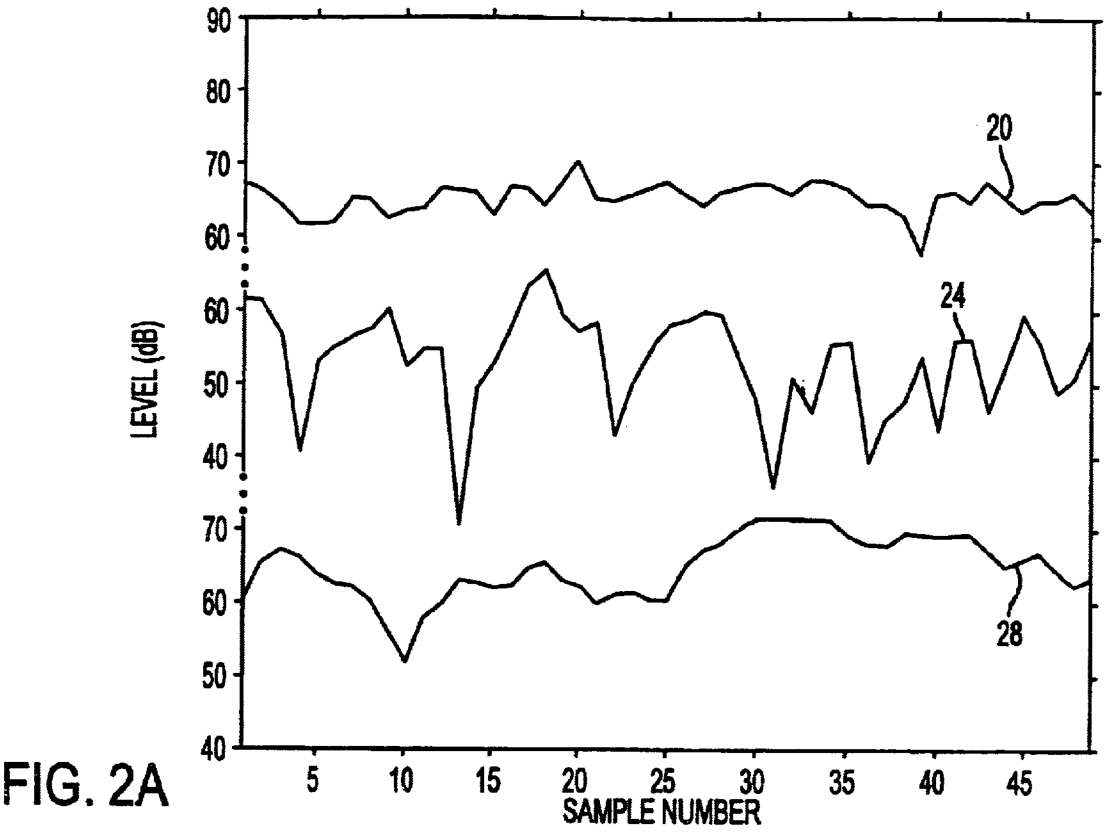
FIG. 2A is a graph illustrating sequential power data samples for two frequency bins that contain acoustic signals including noise and one frequency bin that contains only noise.

FIG. 2A is a graph illustrating sequential power data samples for two frequency bins that contain acoustic signals including noise and one bin that contains only noise. As illustrated in FIG. 2A, sequential power samples, according to the previous power-law method of sequential squaring, are shown as plot 20 for data samples of a first acoustic signal, from a submerged source for example, plot 24 of data samples for noise, and plot 28 for a second acoustic signal from a submerged source that has a trend. Corresponding plots for squared successive log differences, according to the WISPR IV arithmetic operation, (in decibels) are given in FIG. 2B, wherein the plots in FIG. 2B have been illustrated with the same reference numbers as the corresponding sequential power sample plots in FIG. 2A, thereby illustrating the direct relationship between the two.

Figure 2B:
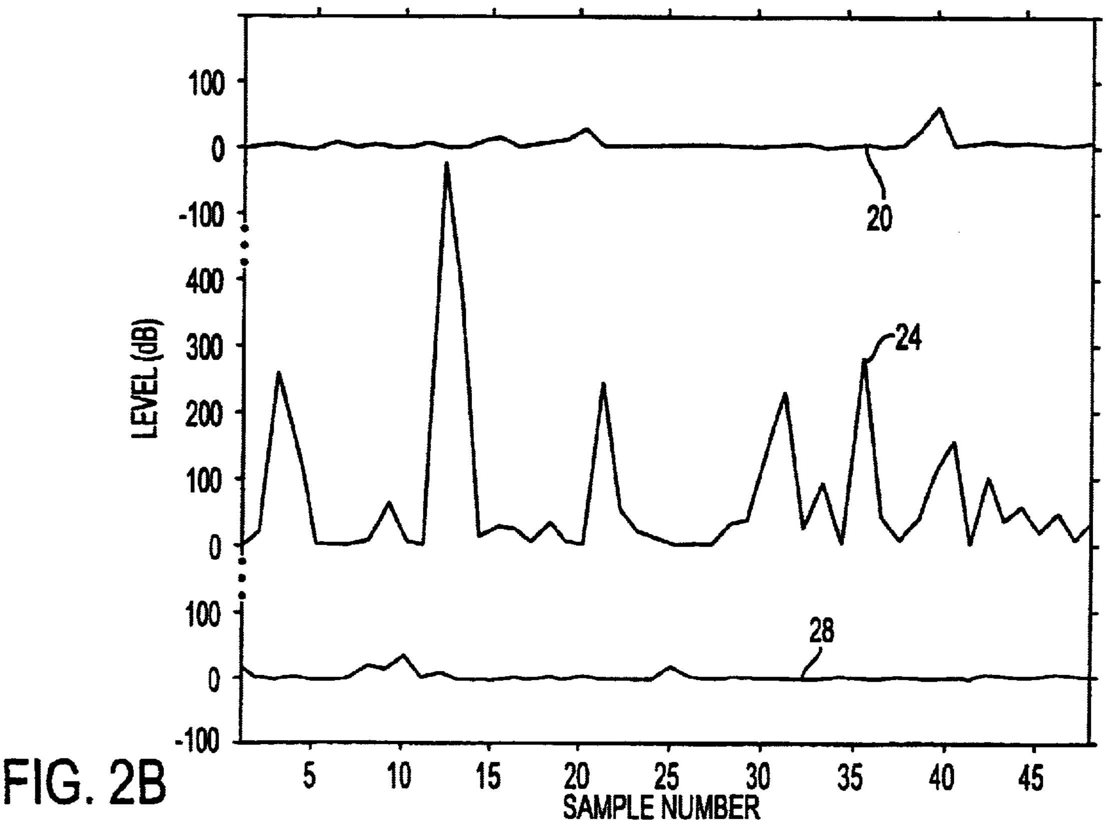
FIG. 2B is a graph illustrating squared successive log differences data samples for two frequency bins that contain acoustic signals including noise and one frequency bin that contains only noise.

In FIG. 2A, with the exception of data samples 20 and 38 of the first acoustic signal, shown in plot 20, and data sample 10 of the second acoustic signal, shown in plot 28, the plots for both signals have relatively small sample-to-sample variation. The corresponding squared successive difference plots in FIG. 2B show very little deviation from zero, except at samples 10, 20, and 39. The noise plot 24, on the other hand, in FIG. 2A, shows large variations between sample numbers, especially at sample numbers 3, 13, 22, 31, and 37. These sample numbers show up as substantial deviations from zero in the corresponding successive difference curve of FIG. 2B. These illustrated differences between signal plots and the noise plots, further evidence that the use of squared differences between successive samples could be a very important tool for differentiating between noise and a signal of an object.

Thus, such differences between the basic characters of plots 20 and 28, compared to noise plot 24, in FIG. 2B, may be utilized in the AWSUM ESA arithmetic operation to enhance signal performance relative to noise. Preferentially, the exponent, Ψ, in the power-law arithmetic operation is changed to be more increase between adjacent data samples. The dependence on the sequential order of occurrence is also a source of an embodiment of the present invention's independence from order-independent AWSUM Filters, and it is one of the reasons why AWSUM ESA can adaptively provide such fluctuation-based signal to noise ratio gains for acoustic signals of objects.

Both of the parameters Ψ and ξ in above AWSUM ESA equation perform very important and similar functions. When exponent Ψ is negative, corresponding to noise or clutter, $r_i$ is inverted and has a value that is less than or equal to unity. On the other hand, the Ψ value for acoustic signals with small fluctuation amplitudes will be positive, with the corresponding $r_i$ term being much larger than unity (e.g., on order of 50,000). This process will result in the acoustic signal of the object dominating the summation in the AWSUM ESA computations. Some of the occasional small fluctuations of the HIFA clutter signals and noise may survive in the aforementioned summation to provide a reduced contribution in the corresponding frequency bins. However, reduced HIFA clutter and noise contributions that survive in the summation process will be inverted by a negative ξ exponent due to large average fluctuations, which effectively eliminates such surviving HIFA clutter signals and noise. The average ξ for an acoustic signal with small fluctuation amplitudes will be positive and not cause the summation to be inverted. Hence, the final AWSUM ESA result for the acoustic signals of an object will not be significantly attenuated. Thus, this technique of adaptively determining these two exponents results in an extremely large acoustic signal processor output signal to noise ratio for signals with small amplitude fluctuations among noise and HIFA clutter signals.

FIGS. 3A–3D and 4A–4C illustrate experimental examples of the above LOFA signal enhancement and HIFA signal and noise suppression capability of the AWSUM ESA arithmetic operation. The data were taken from a measurement exercise conducted approximately 50–100 miles south of Oahu, Hi. The bottom depth of the oceanic region was between 3000 and 6000 m. A surface ship towed a line array of 144 uniformly spaced hydrophone receivers at a depth of approximately 700 m. And two deep sources were present in the region at ranges from the array of 50 to 85 nmi.

The objective of the experiment was to acquire towed-array sonar hydrophone data that could be used in testing the capabilities of fluctuation based processors. The resultant graphs in FIGS. 3A–3D and 4A–4C were generated based upon the aforementioned parameters A and B being 3.5 and −0.25, respectively, and with "n" in the above WISPR IVn arithmetic operation being assigned a value of 3.

Figure 3A:
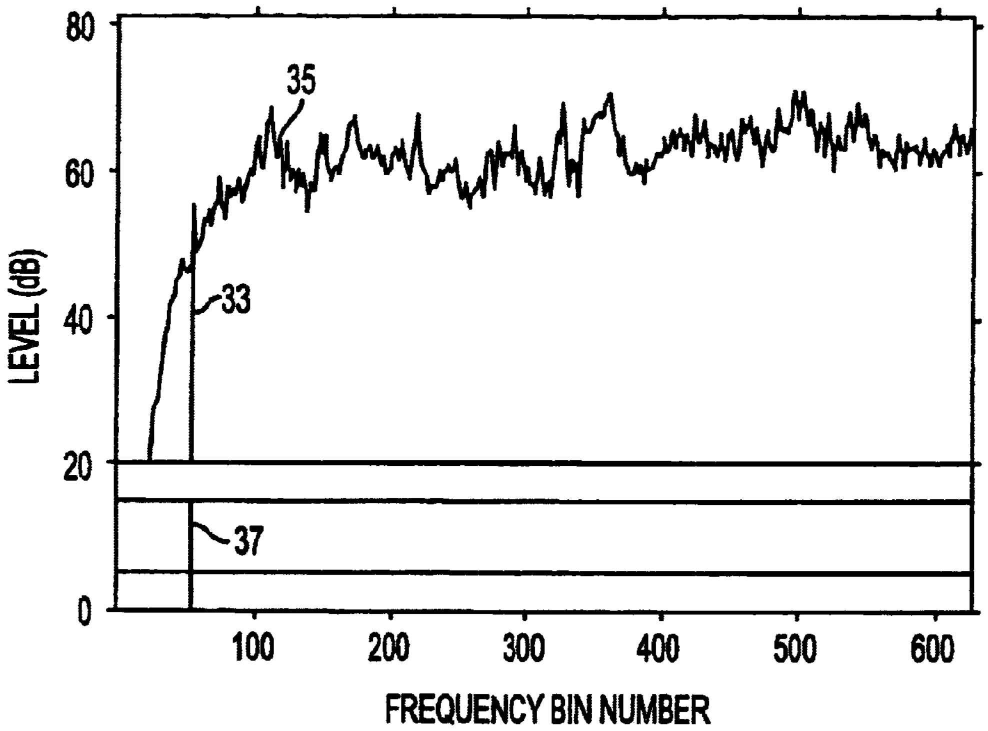
FIGS. 3A and 3C illustrate plots of a first acoustic signal, in FIG. 3A, and a second acoustic signal, in FIG. 3C, along different frequencies in accordance with three different arithmetic operations, AVGPR, AWSUM ESA and ESA.
Figure 3B:
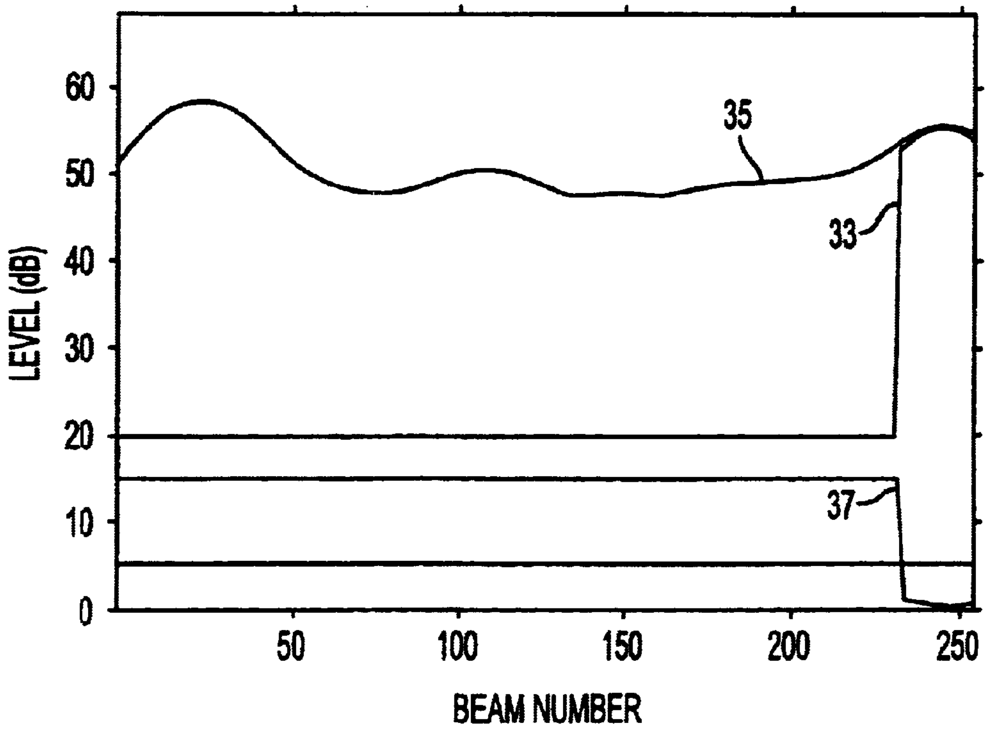
FIGS. 3B and 3D illustrate plots of a first acoustic signal, in FIG. 3B, and a second acoustic signal, in FIG. 3D, along different beam numbers in accordance with three different arithmetic operations, AVGPR, AWSUM ESA and ESA.
Figure 3C:
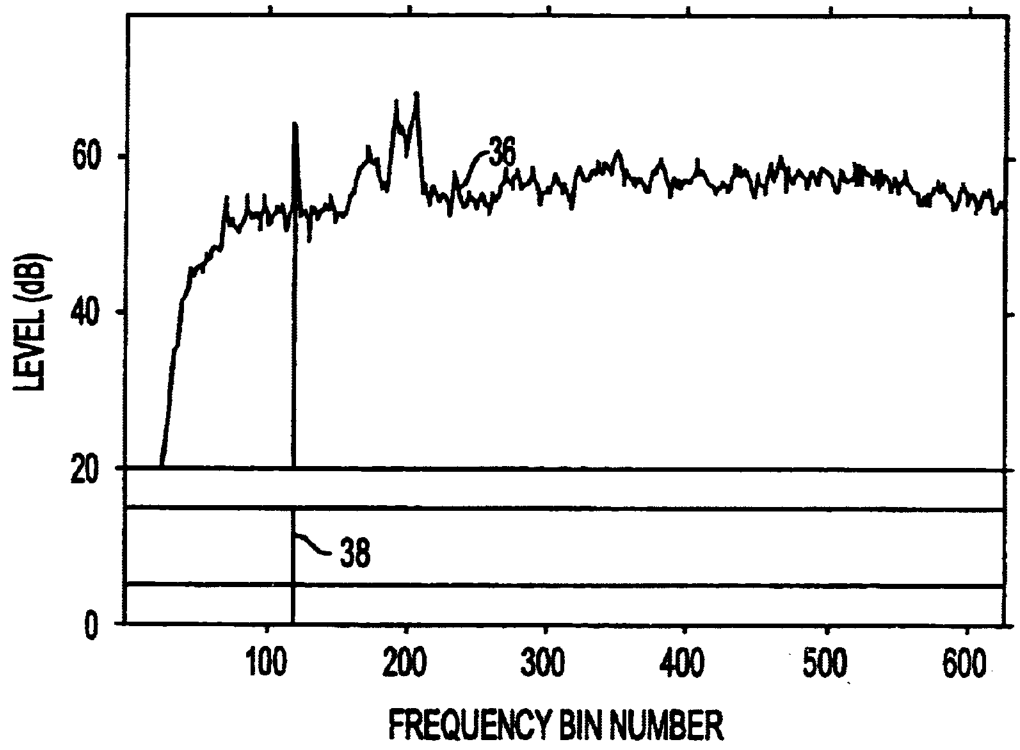
Figure 3D:
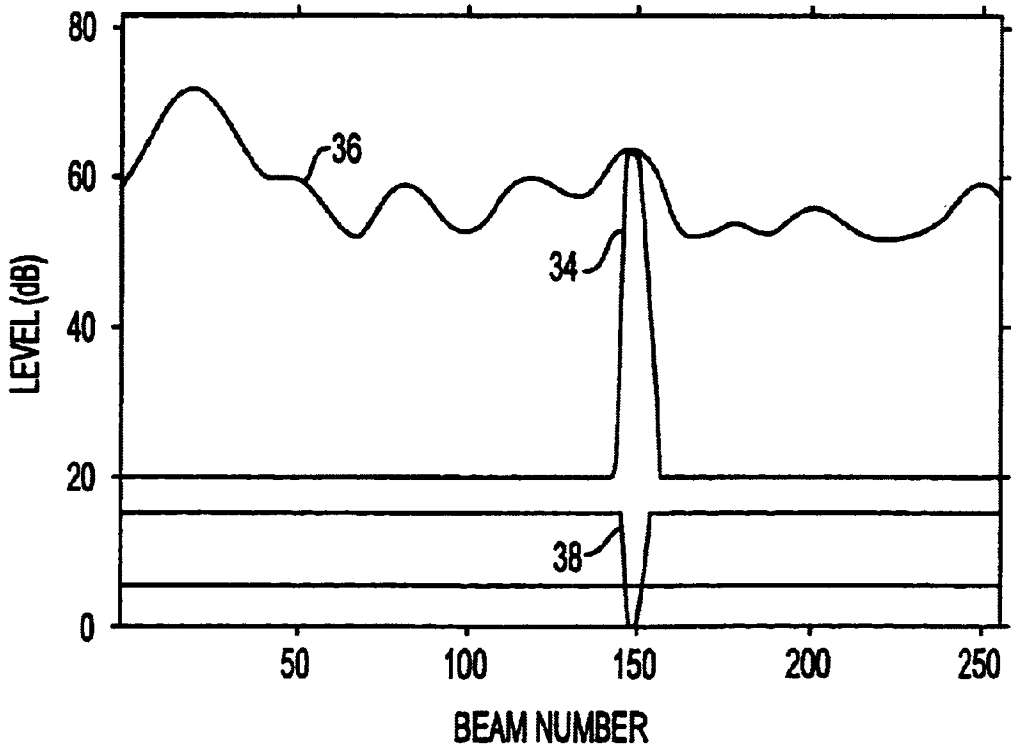
Figure 4A:
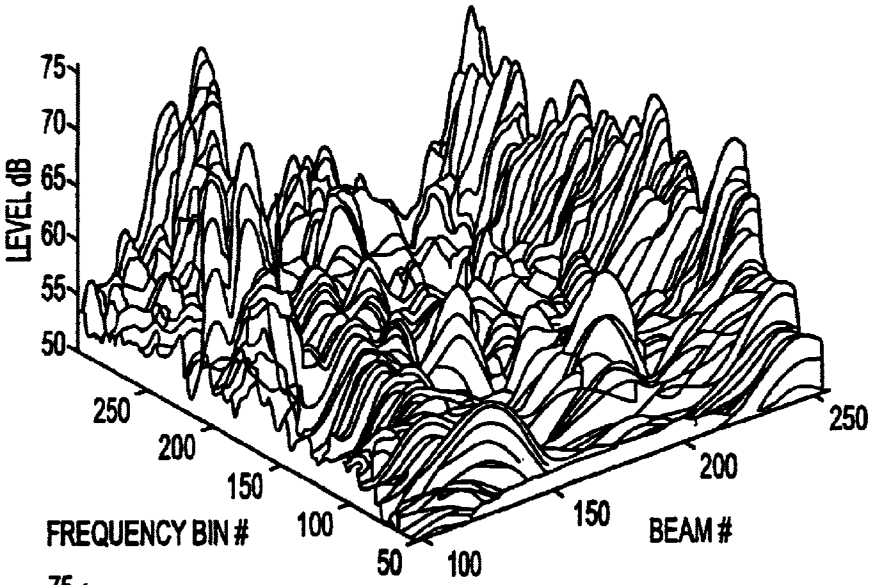
FIG. 4A is a graph illustrating the result of a AVGPR operation on data samples.
Figure 4B:
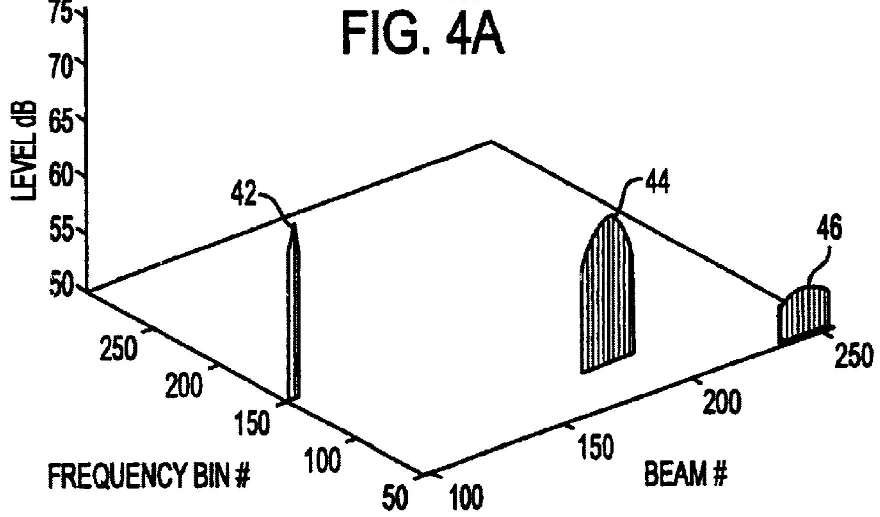
FIG. 4B is a graph illustrating the result of a AWSUM ESA operation on data samples.
Figure 4C:
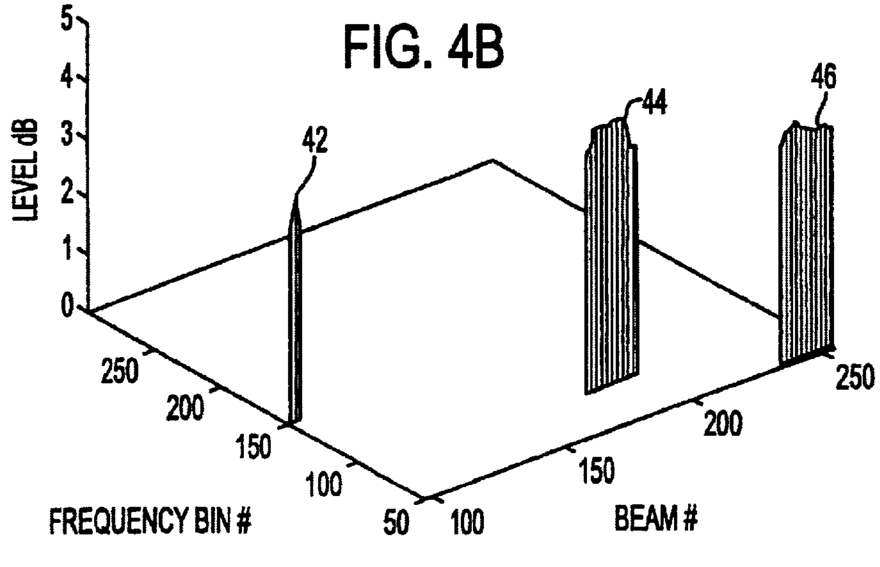
FIG. 4C is a graph illustrating the result of a ESA operation on data samples.

To fully understand FIGS. 3A–3D and 4A–4C, the frequency-beam number illustrated in the figures must be explained. A beam number corresponds to a direction in which acoustic signals have been received, for example, a beam number may correspond to specific geometric degrees of rotation around a hydraphone. For example, a beam encompassing degrees 45–60, out of a total of 360 degrees, would only include acoustic signals from those degrees. For example, FIGS. 4A–4C illustrate received signals from particular directions (beams) and at specific frequencies FIGS. 3A and 3C illustrate plots of a third acoustic signal, in FIG. 3A, and a fourth acoustic signal, in FIG. 3C, along different frequencies in 36, AWSUM ESA, respectively plots 33 and 34, and ESA, respectively plots 37 representing the frequency of the source acoustic signal. Similarly, FIG 3B shows a "spike" in plots 33 and 37.

The AWSUM ESA response to HIFA signals and noise is to attenuate them to the point that they are approximately 0 dB. For all practical purposes, the LOFA signals illustrated in plots 33 and 34, of FIGS. 3A and 3C respectively, are preserved, with the HIFA clutter and noise being attenuated (suppressed). For example, in FIG. 3C, two high level clutter signals near frequency bin number 200 are illustrated in plot 36 and may, inaccurately, indicate the presence of an object, showing the AVGPR operation upon the fourth signal, whereas at the same frequency bin, in the AWSUM ESA plot 34, the corresponding data samples in plot 34 do not, correctly, indicate any presence of an object. Thus, in AWSUM ESA plots 33 and 34, respectively of FIGS. 3A and 3C, the HIFA clutter signals and noise, illustrated in respective AVGPR plots 35 and 36, have likewise been eliminated. In addition, FIGS. 3A and 3C also illustrate that ESA plots 37 and 38, respectively, automatically allow for detection and classification of signals that have small enough fluctuation amplitudes.

The beam number plots in FIGS. 3B and 3D are beam number plots for, respectively, the aforementioned third and fourth acoustic signals, to illustrate the correspondence between the frequency plots and beam number plots, the plots have been illustrated with the same reference numerals. FIGS. 3B and 3D illustrate plots of the third acoustic signal, in FIG. 3B, and the fourth acoustic signal, in FIG. 3D, along different beam numbers in accordance with three different arithmetic operations, AVGPR, respectively plots 35 and 36, AWSUM ESA, respectively plots 33 and 34, and ESA, respectively plots 37 and 38.

As in the case of the frequency plots, the HIFA clutter and noise have been attenuated to the point that they do not appear on the AWSUM ESA plots 33 or 34, of FIGS. 3B and 3D respectively, nor in ESA plots 37 and 38, of FIGS. 3B and 3D. Furthermore, as illustrated in FIG. 3D, for example, AWSUM plot 34 and ESA plot 38 are considerably smaller than the corresponding beam number position in AVGPR plot 36.

FIGS. 3A–3D illustrate the capabilities of the AWSUM ESA and ESA arithmetic operation to preserve and automatically detect and classify signals with small fluctuation amplitudes while severely attenuating and eliminating HIFA clutter signals and noise.

FIGS. 4A–4C further demonstrate that such improved signal to noise performance is not confined to only beams that contain the low fluctuation amplitude signals. FIG. 4A illustrates a graph showing large numbers of noise and HIFA clutter signals. FIGS. 4B and 4C illustrate three distinct detected acoustic signals 42, 44 and 46 that appear to be representative of three independent objects, e.g., three submerged objects. With the exception of the three acoustic signals 42, 44 and 46, the HIFA clutter signals and noises that are dominating the AVGPR results in FIG. 4A are either attenuated below the display thresholds of FIG. 4B and FIG.

4C, or eliminated. From FIGS. 4B and 4C, the presence of the three acoustic signals, representative of detected objects, are clearly illustrated, whereas in FIG. 4A it is difficult to differentiate between noise, HIFA clutter, and actual signals representative of a submersed object.

In view of the above embodiments, the present invention has been set forth as providing a large signal to noise ratio by severely attenuating and/or eliminating signals that have large amplitude fluctuations and noise. In addition, by attenuating and/or eliminating these large amplitude fluctuation signals, a corresponding acoustic signal processor allows for increased spatial and spectral resolutions.

Although 10 log amplitude differences have been used in the WISPR IV operation, an alternative would be to use linear amplitude differences or 10 log of successive squared amplitude ratios (10 log $(r_{i+1}^2/r_i^2)$). Further, an additional alternative would be to use exponents in 10 log $r_i^2$ other than the integer 2. Alternatively, polynomial or nonlinear functions of WISPR IV may be used. In addition, the use of WISPR IV is not necessary, as any function sensitive to amplitude fluctuations, which does not necessarily have to be order dependent, could be used as long as it includes the ability to detect the aforementioned differences in amplitude fluctuations. Another alternative is to use the standard deviation, variance, Scintillation Index, or other parameter that is sensitive to amplitude fluctuations instead of $\xi$ in the equation for the AWSUM ESA operation.

As noted above, the aforementioned embodiments utilizing AWSUM ESA and ESA are equally applicable to environments other than underwater environments. In addition to the underwater environment, similar environment induced temporal changes are also generated during optical signal propagation, electrical signal propagation, magnetic signal propagation, or even for electromagnetic signal propagation, though this listing is not exhaustive of the potential applicable propagation pathways and environments. The present invention would likewise be applicable to applications in these propagation pathways and environments where it is necessary to remove noise or at least increase the signal to noise ratio. For example, the present invention could be applicable to medical imaging, where the signal to noise ratio is very important to assure the greatest resolutions.

Although preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. A signal processing method, comprising:

receiving a plurality of data samples; and filtering a first group of the plurality of received data samples for a first signal by applying a power-law arithmetic operation to the first group of data samples, such that the power-law arithmetic operation is adaptively changed based on an order dependent determination of whether the first group of the data samples is representative of noise or clutter wherein the order dependent determination includes use of a WISPR IV operation defined in terms of acoustic power as:

$$WISPR\ IV_n = \frac{1}{N-n+1}\sum_{m=1}^{N-n+1}\left\{\frac{2}{n(n-1)}\left[\sum_{i=m+1}^{m+n-1}\sum_{j=m}^{i-1}(Y_i-Y_j)^2\right]\right\}$$

-continued where $$Y_i = 20\log r_i = 10\log r_i^2$$

and $(Y_m - Y_i)$ = the successive log differences in the above 10 log power (20 log $(r_m/r_i)$);

$n$ = group size, i.e., the number of data samples that are used to form the differences;

$N$ = the total number of data samples in a corresponding frequency bin; and $r_i$ = the ith pressure amplitude, as similarly used in $AVGPR$.

2. The signal processing method of claim 1, wherein the data samples of the first group were received at a predetermined frequency.

3. The signal processing method of claim 1, further comprising:

filtering a second group of the plurality of received data samples, different from the first group, for a second signal by applying a power-law arithmetic operation to the second group of data samples, such that the power-law arithmetic operation is adaptively changed based on an order dependent determination of whether the second group of the data samples is representative of noise or clutter.

4. The signal processing method of claim 3 wherein the data samples of the first group are received at a first predetermined frequency and the data samples of the second group are received at a second predetermined frequency.

5. The signal processing method of claim 1, further comprising:

filtering a second group of the plurality of received data samples, different from the first group, for the first signal by applying a power-law arithmetic operation to the second group of data samples, such that the power-law arithmetic operation is adaptively changed based on an order dependent determination of whether the second group of the data samples is representative of noise or clutter.

6. The signal processing method of claim 5, wherein the data samples of the first group are received at a first predetermined frequency and the data samples of the second group are received at a second predetermined frequency.

7. The signal processing method of claim 1, wherein the order dependent determination is based on an average of a series of squared differences between successive data samples of the first group.

8. The signal processing method of claim 1, wherein the applying of the power-law arithmetic operation to the first group of data samples corresponds to an optimum power-law arithmetic operation when there are small successive differences between the data samples of the first group.

9. The signal processing method of claim 1, wherein when data samples of the first group are representative of noise or clutter, an exponent for the power-law arithmetic operation has a negative value.

10. An apparatus for filtering noise from a received signal to improve the signal to noise ratio of the received signal, comprising:

a processor programmed to filter data samples of the received signal by applying a power-law arithmetic operation to the data samples, such that the power-law arithmetic operation is adaptively changed based on an order dependent determination of whether the data samples are representative of noise or clutter wherein the order dependent determination includes use of a WISPR operation defined in terms of acoustic power as:

$$WISPR\ IV_n = \frac{1}{N-n+1}\sum_{m=1}^{N-n+1}\left\{\frac{2}{n(n-1)}\left[\sum_{i=m+1}^{m+n-1}\sum_{j=m}^{i-1}(Y_i - Y_j)^2\right]\right\}$$

where $Y_i = 20 \log r_i = 10 \log r_i^2$ and $(Y_m - Y_i)$ = the successive log differences in the above 10 log power (20 log $(r_m/r_i)$);

$n$ = group size, i.e., the number of data samples that are used to form the differences;

$N$ = the total number of data samples in a corresponding frequency bin; and $r_i$ = the ith pressure amplitude, as similarly used in $AVGPR$.

11. The apparatus of claim 10, wherein the data samples were received at a predetermined frequency.

12. The apparatus of claim 10, wherein the order dependent determination is based on an average of a series of squared differences between successive data samples.

13. The apparatus of claim 10, wherein the applying of the power-law arithmetic operation to the data samples corresponds to an optimum power-law arithmetic operation when there are small successive differences between the data samples.

14. The apparatus of claim 10, wherein when data samples are representative of noise or clutter, an exponent for the power-law arithmetic operation has a negative value.

15. An acoustic measuring method, comprising:

sampling acoustic data;

spectrum analyzing the sampled acoustic data;

storing the analyzed acoustic data in corresponding frequency bins; and filtering acoustic data stored in a first frequency bin by applying a power-law arithmetic operation to the first frequency bin acoustic data, such that the power-law arithmetic operation is adaptively changed based on an order dependent determination of whether the first frequency bin acoustic data is representative of noise or clutter wherein the order dependent determination includes use of a WISPR IV operation defined in terms of acoustic power as:

$$WISPR\ IV_n = \frac{1}{N-n+1}\sum_{m=1}^{N-n+1}\left\{\frac{2}{n(n-1)}\left[\sum_{i=m+1}^{m+n-1}\sum_{j=m}^{i-1}(Y_i - Y_j)^2\right]\right\}$$

where $Y_i = 20 \log r_i = 10 \log r_i^2$ and $(Y_m - Y_i)$ = the successive log differences in the above 10 log power (20 log $(r_m/r_i)$);

$n$ = group size, i.e., the number of data samples that are used to form the differences;

$N$ = the total number of data samples in a corresponding frequency bin; and $r_i$ = the ith pressure amplitude, as similarly used in $AVGPR$.

16. The acoustic measuring method of claim 15, wherein the applying of the power-law arithmetic operation to the first frequency bin acoustic data corresponds to an optimum power-law arithmetic operation when there are small successive differences between the first frequency bin acoustic data.

17. The acoustic measuring method of claim 15, further comprising filtering acoustic data stored in a plurality of frequency bins by applying a power-law arithmetic operation to each of the plurality of frequency bins' acoustic data, such that the power-law arithmetic operation is adaptively changed based on an order dependent determination of whether each frequency bins' acoustic data is representative of noise or representative of a signal.

18. The acoustic measuring method of claim 15, wherein a user is notified when the filtering of the acoustic data indicates that a signal has been received indicating a location of an object.

19. The acoustic measuring method of claim 18, wherein the object is a submersed object.

* * * * *